March 15, 1966  F. O. HESS  3,240,850
MANUFACTURE OF STRUCTURAL SLABS
Filed March 8, 1963
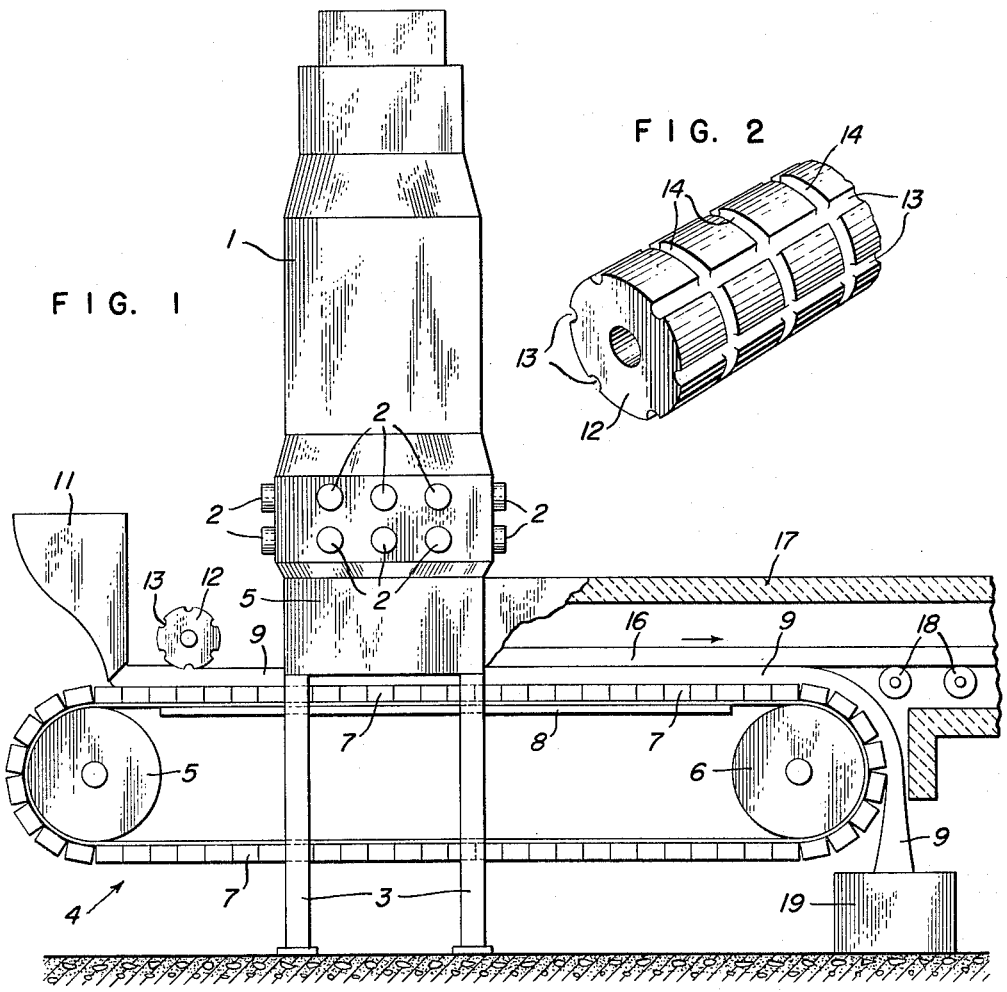
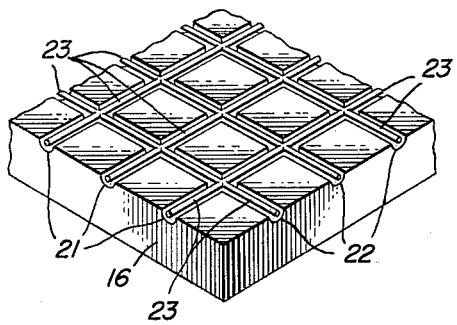
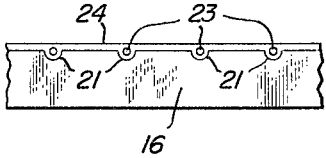
INVENTOR.
FREDERIC O. HESS
BY
ATTORNEY.

United States Patent Office 3,240,850
Patented Mar. 15, 1966

3,240,850
MANUFACTURE OF STRUCTURAL SLABS
Frederic O. Hess, Skytop, Pa., assignor to Selas Corporation of America, a corporation of Pennsylvania
Filed Mar. 8, 1963, Ser. No. 263,865
7 Claims. (Cl. 264—125)

The present invention relates to cellular ceramic slabs useful as structural elements, and more particularly to method of making and reinforcing such slabs.

Slabs of the type with which this invention is concerned have previously been made by placing reinforcing elements, such as steel wire, rods or mesh, on a form and bloating ceramic material, such as clay, around the elements. Such a method, however, has proved to be unsatisfactory since the heat of bloating and the atmosphere created thereby causes the reinforcement elements to oxidize to such an extent that their strength is reduced to a negligible value.

It is an object of the present invention to provide a method of reinforcing cellular ceramic slabs. It is a further object of the invention to provide a method of making reinforced cellular slabs or slabs with decorative surfaces which can be used for various structural purposes.

In practicing the invention the material forming the slab is collected on a traveling mold. This mold is so shaped that, as the slab is built up on it, the slab will be formed with surfaces that are decorative or into which the reinforcing elements can be placed. These elements, if they are used, are then cemented into place to complete the reinforcing of the slab.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a view, partly in section, of a slab forming apparatus,

FIG. 2 is a view of a mold roller,

FIG. 3 is a view of slab with the reinforcing elements in place, and

FIG. 4 is a view of a finished slab.

In FIG. 1 of the drawing there is shown at 1 a tower furnace similar to that disclosed in Blaha Patent No. 3,071,357. Such a tower furnace is used to heat, for example, small particles of clay or like material by means of the burners 2 in a heating zone as these particles are dropped through the furnace. The particles are heated, as explained in the above mentioned patent, to their fusion point, whereupon they will bloat into individual spheres which may be chilled and collected as aggregate, or which may be collected while their surfaces are still tacky so that they will stick together to form an agglomerate which will cool into a rigid cellular body. The shape of the body will depend upon the manner in which it is collected.

Furnace 1 is mounted on supports 3 so that it straddles a conveyor 4. The conveyor includes an endless belt that passes around driven rollers 5 and 6 so that the upper surface of the belt moves horizontally toward the right in the drawing. The belt is provided with refractory plates 7 that come together along the upper run to form a flat surface that is supported by a table 8, which may be attached to the supports 3.

A mold material, which may be ordinary molding sand, is laid along the upper surface of the belt as it is moving, as indicated by 9. This material serves as a separator between refractory blocks 7 and the slab, as well as to form a desired configuration on the slab surface. The sand is placed on the belt as it leaves roller 5 by means of a hopper 11 which is so designed that the discharge end of the hopper places the sand in a layer of fixed thickness on the belt. The sand is compacted, and is formed with ridges on its upper surface by means of a roller 12 that is suitably journaled for rotation to engage the sand as it moves with the belt. This roller is provided on its surface with a plurality of axially extending grooves 13 and a plurality of circumferentially extending grooves 14 so that the sand is formed on its upper surface with a series of ridges that follow the pattern of the grooves on the roller. Therefore, as the belt travels to the right in FIG. 1 of the drawing, its upper surface is a mold which has a pattern of ridges. This mold determines the shape of the lower surface of the slab.

When the furnace is operating, bloated particles are collected on the sand while these particles are still hot and have a tacky surface. As the belt moves under the furnace the particles accumulate thereon to a thickness determined by the speed of the belt and the amount of material that is being fed through the furnace. This material, when it is chilled, will form a rigid slab that is moved to the right beyond the furnace into a cooling and annealing zone 17 connected to the exit of the furnace. When the slab cools down slightly it will become rigid enough so that it is self-supporting. At this time the slab is passed from the bed of sand on to rollers 18 as it continues to move through annealing zone 17 while it is being cooled at a slow enough rate to prevent stresses from being retained in it. The sand will follow around with the belt, fall off and be collected in a suitable bin 19 for reuse.

The slab will have a cellular structure and will be similar to that described in Blaha Patent No. 3,056,184, which is directed to the method of making slabs of this type. In this case, however, the slab is shaped by the mold so that its lower surface has therein a series of grooves 22 in a pattern in which it is desired to place reinforcing elements. The bloated material is collected in the form of a continuous sheet and will be cut either before or after the annealing is completed in desired lengths as slabs. This slab is a rigid, cellular body that can be used for many structural purposes. In many cases, however, it is desired to reinforce the slab so that it will be stronger, for example, when it is to be used as a roof deck and is spanning a considerable distance. The slab, after it has been cut to length, will be turned over so that the grooves 22 are in its upper surface as is shown in FIG. 3. A grid of reinforcing elements indicated as a mesh of wires or rods 23 will then be laid in the grooves as shown in that figure. The slab is then covered with a thin coat of suitable cement 24 that will stick to the slab to cover and permanently retain the reinforcing elements in the grooves. When the cement is dried, the slab will be a one piece body with suitable reinforcements in it.

It will be apparent that the roller 12 can be provided with grooves in any desired depth or pattern which will conform with the manner in which the slab is to be reinforced. The grooves will generally be deep enough so that the reinforcing elements will lie below the surface of the slab, and so that the cement can entirely surround the element. In some cases the pattern will be grid as shown in the drawings; whereas in some cases only the circumferential grooves 14 of the roller 12 will be used when it is only necessary to have the reinforcing elements extending lengthwise of the slab. It will also be apparent that the reinforcing elements can be steel wires or rods, or that they can be made of some other material such as glass fiber threads that are held taut while they are being cemented in place. The slab itself is a ceramic material with glasslike characteristics. It is generally desirable to use a Portland or gypsum cement of a quick setting variey, which is also a ceramic, to cement the reinforcing elements in the grooves as the slab is being finished. It will be apparent, however, that the reinforcing elements can be held in place by a suitable plastic material that will be rigid when it is cured. The choice will depend upon cost considerations and the type and color of surface that is desired.

In many cases slabs of the type described can be used for structural purposes where reinforcing is not necessary. In such uses, as a wall panel for example, it may be desirable to have the surface of the slab provided with a decorative design. This can readily be accomplished by having the desired design formed on the surface of roller 12. Such a design would be rolled, in reverse, into the sand or other mold material 9 and could either be raised or depressed. The material collected on the mold material 9 would then have the desired decorative design formed on its surface just as the grooves 22 were formed. Slabs made according to the invention can be used in their natural state, or the surface can, of course, be painted if desired.

Form the above description it will be seen that I have provided a method of making a slab which has formed or provided in its surface a decorative pattern or a means for receiving reinforcing elements of a predetermined desired pattern. If the slab is to be reinforced, elements are cemented to the slab in such a fashion that a unitary reinforced structural slab is made which has the desirable insulating and waterproof characteristics of a cellular ceramic material, and also the additional strength that is imparted to it by means of suitable reinforcing material.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of making a reinforced ceramic slab which comprises:
    collecting on a surface individually bloated clay particles, while their surfaces are still at a temperature high enough to be tacky, in sufficient quantities to produce a slab of a predetermined thickness,
    forming on the face of the slab which engaged said surface as the slab is being formed grooves in a pattern corresponding to a predetermined location of reinforcing elements,
    cooling said slab to permit it to become rigid and remove stresses therein,
    placing reinforcing elements in said grooves, and
    cementing said reinforcing elements permanently in said grooves.

2. The method of claim 1 in which the cement holding said elements in place is of a layer thick enough to form a smooth surface on said slab.

3. The method of making a structural slab which comprises:
    forming a traveling mold having raised portions thereon conforming to a predetermined pattern of reinforcing elements on the slab,
    collecting individual cellular ceramic particles at a temperature high enough for their surfaces to be tacky on said mold to build up a slab having grooves on its surface corresponding in size and shape to the raised portions on said mold,
    placing reinforcing elements in the grooves on said slab, and
    fastening said reinforcing elements permanently in said grooves.

4. The method of claim 3 in which said reinforcing elements are fastened in said grooves by spreading a cement in said grooves and over said elements to form a smooth surface on said slab.

5. The method of making a reinforced structural slab comprising:
    forming a mold at a given location on a belt moving in a given direction, said mold having a surface upon which the slab is to be collected,
    forming ridges on said surface in a pattern conforming to a predetermined pattern of reinforcing elements to be used,
    collecting individual cellular particles of bloated aggregate hot enough for its surface to be tacky on said mold to a thickness corresponding to a predetermined thickness of the slab at a location beyond said given location in the direction of belt movement,
    cooling said aggregate to produce a rigid slab,
    removing the slab from the mold,
    placing reinforcing elements in said grooves, and
    fastening said reinforcing elements in said grooves.

6. The method of making a reinforced structural slab which comprises:
    moving a conveyor through a path,
    placing mold material in a layer on said conveyor,
    forming projections on the upper surface of said material in a pattern conforming with a predetermined location of reinforcing elements in the slab,
    collecting individual particles of a bloated material whose surface is hot enough to be tacky to form the slab to a predetermined thickness on the mold material,
    removing the slab from the material,
    placing reinforcing elements in the grooves formed on the slab by the projections on the molding material, and
    cementing the reinforcing elements to the slab.

7. The method of making a structural slab of agglomerated material which comprises:
    providing a horizontally moving collecting surface,
    forming on said surface a design which it is desired to have on the surface of a slab,
    placing on said surface individually bloated clay particles, while their surfaces are still at a temperature high enough to be tacky, in sufficient quantities to produce a slab of a predetermined thickness,
    cooling the slab to permit it to become rigid, and
    removing the collecting surface from the slab to leave the slab with the design formed thereon.

References Cited by the Examiner

UNITED STATES PATENTS

| | | | |
|---|---|---|---|
| 804,329 | 11/1905 | Martin | 22—22 |
| 1,892,583 | 12/1932 | Pine | 264—125 |
| 2,052,324 | 8/1936 | Thompson | 264—42 |
| 2,271,845 | 2/1942 | Parsons | 264—125 |
| 2,803,868 | 8/1957 | Dobell | 264—220 |
| 3,056,184 | 10/1962 | Blaha | 264—125 |

FOREIGN PATENTS

| | | |
|---|---|---|
| 369,838 | 11/1906 | France. |
| 834,307 | 8/1938 | France. |
| 287,077 | 9/1913 | Germany. |
| 15,586 | 3/1906 | Norway. |
| 151,717 | 10/1952 | Sweden. |

ROBERT F. WHITE, *Primary Examiner.*

ALEXANDER H. BRODMERKEL, *Examiner.*